United States Patent [19]

Nakagawa

[11] 4,382,604
[45] May 10, 1983

[54] STRUCTURE OF A RUNNING SYSTEM IN A WORK VEHICLE

[75] Inventor: Masao Nakagawa, Sakai, Japan

[73] Assignee: Kubota Ltd., Japan

[21] Appl. No.: 235,898

[22] Filed: Feb. 19, 1981

[30] Foreign Application Priority Data

Sep. 25, 1979 [JP] Japan .................... 54-132709

[51] Int. Cl.³ .................................... B60P 1/18
[52] U.S. Cl. .................... 280/6 H; 280/6.11; 280/112 R; 280/714
[58] Field of Search .............. 280/111, 714, 112 R, 280/6.11, 6 H; 414/694

[56] References Cited

U.S. PATENT DOCUMENTS

| | | | |
|---|---|---|---|
| 3,184,867 | 5/1965 | Symmank | 280/6.11 |
| 3,396,984 | 8/1968 | Cadiou | 280/6.11 |
| 4,152,000 | 5/1979 | Meisel, Jr. | 280/6 H |
| 4,152,004 | 5/1979 | Schroder | 280/111 |
| 4,170,279 | 10/1979 | Pelletier | 280/714 |
| 4,205,864 | 6/1980 | Hoefer | 280/714 |
| 4,236,591 | 12/1980 | Molby | 280/6 H |

Primary Examiner—Robert R. Song
Attorney, Agent, or Firm—Kane, Dalsimer, Kane, Sullivan and Kurucz

[57] ABSTRACT

A structure for a running system, in a work vehicle, has right and left running wheels, hydraulic cylinders extensible and retractable in opposition to each other in response to axle-tilting displacement of the wheels as they rise and lower in turn in opposition to each other, a conduit connecting the cylinders with each other with an on-off valve interposed therein to be arbitrarily maneuverable thus to enable the lock up of both cylinders, and, a supply conduit made connectable to the cylinder-connecting conduit. There are provided valves in order to permit oil to be supplied only when inner pressure within this cylinder-connecting conduit has dropped to show negative pressure below a preset threshold.

4 Claims, 3 Drawing Figures

STRUCTURE OF A RUNNING SYSTEM IN A WORK VEHICLE

BACKGROUND OF THE INVENTION

1. Field of the Invention

This invention relates to a structure for a running system in a vehicle, with provisions for right and left running wheels, hydraulic cylinders extensible and retractable in opposition to each other in response to the axle-tilting displacement of the wheels as the wheels rise and lower in turn in opposition to each other, a conduit connecting the cylinders to each other with an on-off valve interposed therebetween to be arbitrarily manueverable thus allowing the lock up of both cylinders, and a supply conduit for supplying oil thereto.

2. Description of the Prior Art

Work vehicles equipped with the structure mentioned hereinabove are advantageously adapted to travel even on irregular terrain, while keeping their body stable by avoiding any substantial rolling of the body by effectively absorbing in the axle-suspension means any possible axle-tilting irregular displacement of the wheels as they are raised and lowered in opposition to each other, and on the other hand also to perform the intended work with the vehicle stationed firmly with the body in a stable position by avoiding any substantial rocking movement under reaction of the work force, by locking up both cylinders, and thus having all the wheels stand securely on the ground.

However, when performing for instance lateral excavation work with both cylinders locked up as mentioned above, the vehicle body might be subjected to an alternating movement of the body due to the reaction force resulting from such work. Furthermore, when such reaction force is relatively large and acts very abruptly the hydraulic cylinder on one side of the vehicle is subjected to a high compressive stress which raises the inner pressure therein and which has conventionally resulted in oil leakages from the cylinder and from the conduit connecting the cylinder to the on-off valve. Meanwhile, the second hydraulic cylinder on the other side is subjected to a high tensile stress which rapidly lowers the pressure within the cylinder, thus resulting in the bubbling of the gases within the oil of the second cylinder (as may occur upon sudden decompression of gases disolved in a liquid under big pressure and also upon intrusion of external gases) and in the conduit connecting the second cylinder to the on-off valve. Since the rolling movement of the vehicle body is attenuated normally rather gradually in the course of the repeated transverse rocking cycles, the big reaction force creates repeatedly the above described effects on both cylinders, causing gradual loss of the oil in the cylinders, and making it impossible after awhile to firmly maintain the working position of the vehicle as it was originally set up.

SUMMARY OF THE INVENTION

In view of the above this invention has as its object, by means of a structurally simple improvement, to eliminate the problems in the hydraulic system so as to securely maintain the vehicle body position as initially set and thus stably perform the work, as well as to allow the vehicles to travel by releasing both cylinders to thereby effectively restrain the rolling movement of the vehicle body.

The structure for the running system in the work vehicle, according to this invention, comprises provision for right and left running wheels, hydraulic cylinders, extensible and retractable in opposition to each other in response to axle-tilting displacement of the wheels as the wheels rise and lower in turn in opposition to each other, a conduit connecting the cylinders to each other with an on-off valve interposed therebetween to be arbitrarily maneuverable thus enabling the lock up of the cylinders, and a conduit connected to the cylinder-connecting conduit for supplying oil to fill any of the cylinders, characterized in that said oil-supply conduit is connected to the on-off valve in a bifurcate manner to both lateral sides thereof, and that in both bifurcation branch passages there are provided, respectively, valves adapted to supply oil from said supply conduit only when the inner pressure within this cylinder-connecting conduit has dropped to a pressure below a preset threshold.

Thus, during the performance of the vehicle to be stationed firmly, i.e. with both requiring cylinders locked up, if and when under the influence of the reactive force of the work as is exerted on the vehicle body there actually occurs an oil leakage from one cylinder that is in a compression state and bubbling phenomena in the other cylinder that is brought to negative or low pressure, then such negative pressure, upon recognition thereof as being lower than the preset threshold, is effectively utilized for activating the oil supply from said supply conduit to such cylinder under the negative pressure. Since the negative pressure and the compression appear alternatingly in both cylinders in accordance with the alternating rolling movement of the vehicle body, additional oil is supplied alternatingly to both cylinders. Such oil supply provides the advantage of keeping a constant volume of oil in both cylinders, and permits the vehicle body to retain its position as intitially locked, and thus performing the work with the vehicle stationed firmly on the ground. Needless to say, the inherent function of the cylinders, namely of avoiding the rolling during the travel, may be left uninhibited simply by releasing the locking-up thereof.

Still other objects and advantages accruing therefrom will become apparent from the detailed description following hereunder:

BRIEF DESCRIPTION OF THE DRAWINGS

The drawings show, by way of example, an embodiment of the structure of the running system in a work vehicle, according to this invention, wherein.

DESCRIPTION OF THE PREFERRED EMBODIMENT

Figure 1:
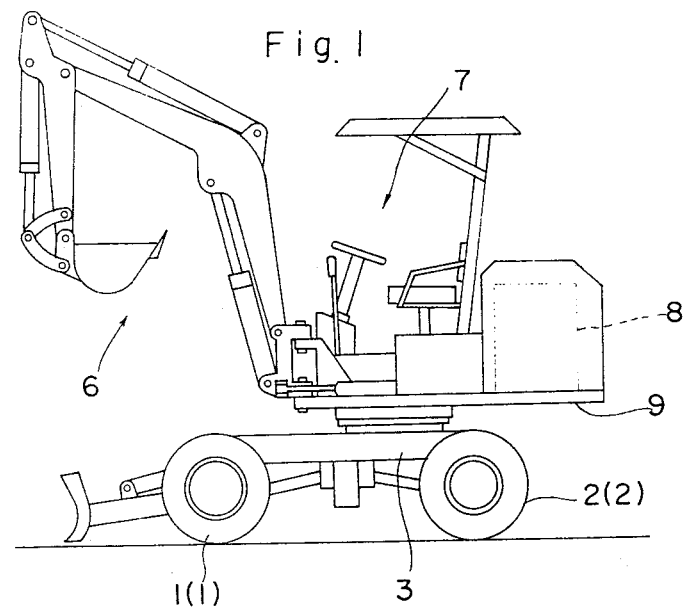
FIG. 1 is an overall side elevation of the work vehicle.
Figure 2:
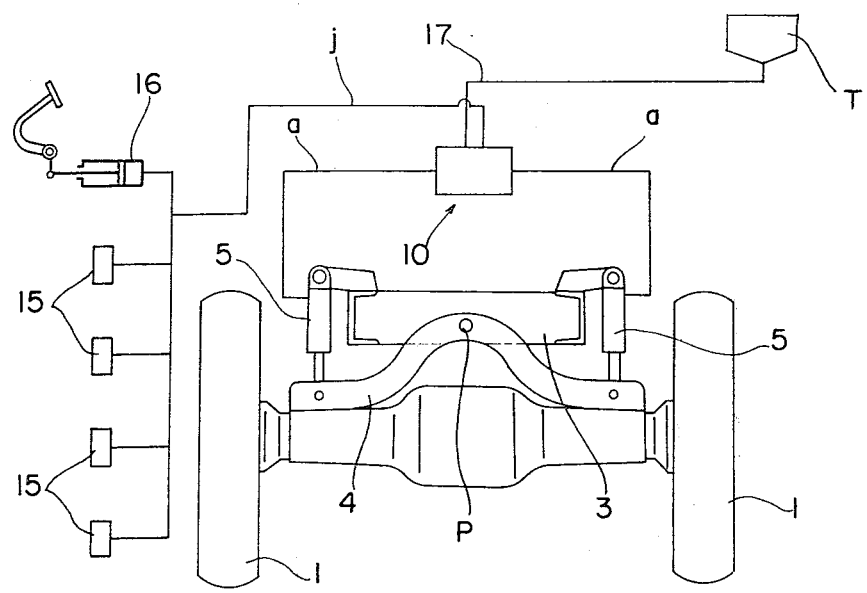
FIG. 2 is a diagramatic view of the running system structure and FIG. 3 is a sectional view of the valving means used in this structure.

Shown in FIGS. 1 and 2 is a work vehicle with: a pair of right and left steerable front wheels (1), (1), with the axle therefor suspended for free tilting movement about a horizontal longitudinal pin (P) to allow the wheels (1), (1) to raise and lower in opposition to each other, and a pair of right and left rear wheels (2), (2), suspended without such tilting means but with proper cushioning means, respectively from the vehicle body (3); hydraulic cylinders (5), (5) interposed in between the axle-suspension framing (4) for said front wheels (1), (1) and the vehicle body (3), on either side of the horizontal pin (P), one on the right side and the other on the left side thereof; a conduit (a) connecting the respective bottom chambers of these cylinders (5), (5) to each other, whereby the pistons of the cylinders (5), (5), may extend and retract in opposition to each other in response to the axle-tilting displacement of the wheels (1), (1); and a swivel platform (9) equipped with an excavation work appliance (6), maneuvering quarter (7) and an engine (8) mounted thereon, the platform being provided for free swiveling drive, about vertical axis, relative to the vehicle body (3).

Figure 3:
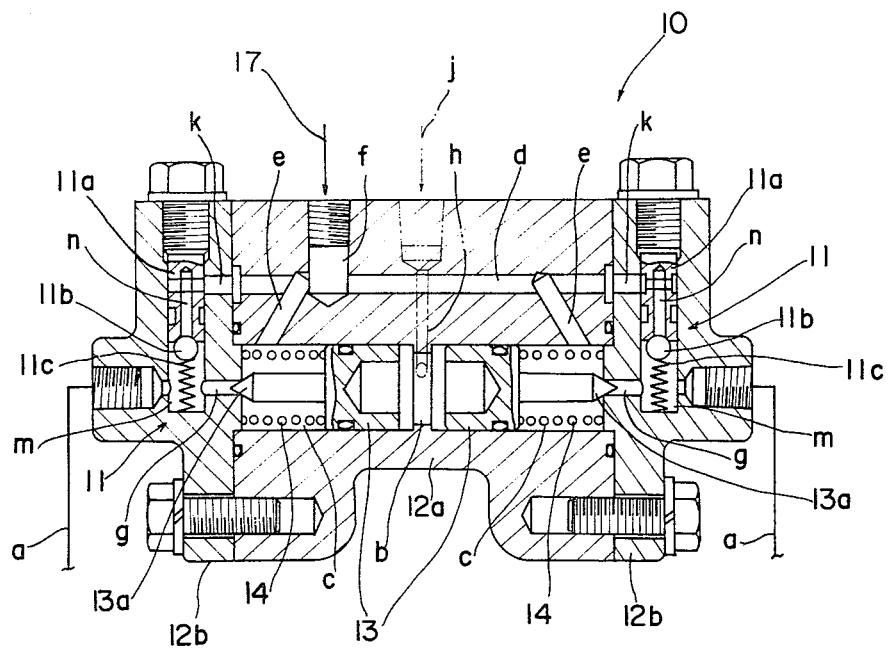

In said conduit (a) connecting the hydraulic cylinders (5), (5), to each other there is provided an on-off valve (10), as shown in detail in FIG. 3, to enable the lock up of cylinders (5), (5). Valves (11), (11), are integrally incorporated in the casing of on-off valve (10) in the respective flow passages to the cylinders, and are adapted to supply oil therethrough only when the cylinder-connecting conduit (a) is subjected to a negative pressure lower than a preset threshold and valve (10) is shut off. The threshold level of the valves (11), (11), are preset to the pressure sufficient enough to cause bubbling in the oil within a particular cylinder and respective portion of said conduit (a) which is subjected to a large tensile stress, due to a large work reaction force. Furthermore, as previously stated, during the time that bubbling may be produced in one cylinder, the pressure within the other cylinder and the respective portion of conduit (a) connecting said other cylinder to the on-off valve increases to a high enough level to cause an oil leakage from the cylinder (5) and/or from the portion of said conduit (a).

Referring to FIG. 3, the on-off valve (10) is constructed with: a valve casing proper (12a), in which there are respectively provided coaxial piston chambers (c), (c) made to communicate with each other via a constricted passageway (b), a passageway (d) formed in parallel therewith, passageways (e), (e) respectively connecting the piston chambers (c), (c) with the passageway (d) and a passageway (f) to connect an oil-supply conduit (17), connected to a tank (T), with said passageway (d); two valve casing lids (12b), (12b) in which respective passageways (g) are formed to come to communicate with said piston chambers (c), (c) and which are securely mounted on the respective lateral sides of the said valve casing body proper (12a) so as to actually set the passageways (g) and the piston chambers (c) in coaxial alignment; and pistons (13), (13) disposed within chambers (c), (c), and with a needle valve stem (13a) to open and close the lid-passages (g), piston being urged within the respective piston chamber (c), by a spring (14) to an open-valve state. Each passageway (g) is connected by the respective conduit (a) portion to each hydraulic cylinder (5) (See FIG. 2), thereby allowing the hydraulic cylinders (5), (5) to extend and retract in opposition to each other responding to the axle-tilting displacement of the right and left wheels (1), (1), as they raise and lower in turn in opposition to each other.

Further construction is provided so as to enable the arbitrary selective manuevering of the axle-tilting displacement of the right and left wheels (1), (1) in their raising and lowering in opposition to each other and of the locking up of the cylinders in such a manner that in the body proper (12a) there is formed a passageway (h) in communication with the passageway (b) disposed between pistons (13), (13) urged to the open-valve state, and that this piston-urging passageway (h) and an operator-manuevered master cylinder (16) (See FIG. 2.) for actuation of brake cylinders (15) incorporated in the respective wheels are connected to each other via a pilot passageway (j), whereby a brake actuation causes the needle valve stems (13a), (13a), in consequence thereof to close the respective lid-passageways (g), (g), thus locking up the cylinders (5), (5).

In the valve casing comprised of said valve casing body proper (12a) and lids (12b), (12b) mounted on both lateral sides thereof, there are incorporated two valves (11), (11) for the supply of oil to the respective cylinder-connecting conduit (a) portions in such a manner that in each said valve casing lid (12b) there are formed passageways (k), (k) which communicate with the passageway (d) formed in said body proper (12a) and passageways (m), (m), connecting passageways (k) to the respective lid-passageway (g). A body proper (11a) is provided with a passageway (n) formed to communicate with passageways (k) and (m), and is fittingly screwed in said passageway (m) for free adjusting of the position in the axial direction thereof. In passageway (n) of this body proper (11a) there is provided a ball valve member (11b), to admit oil flowing from said passageway (k) to the lid-passageway (g) and to check the flow in reverse thereof, by being urged by a spring (11c) to a closed state, whereby the oil supply through the passageway (n) to a particular cylinder-connecting conduit (a) portion is affected only when such particular conduit (a) portion is subjected to a negative pressure lower than the preset threshold as already mentioned hereinabove when the on-off valve (10) is closed, i.e., with the cylinders locked up. Each successive series of said passageways (k), (n) and (m) provides a respective bifurcation branch passage from the oil-supply conduit (17) to the cylinder-connecting conduit (a).

Alternatively, the valves (11), (11) may be respectively connected directly to the respective portions of the cylinder-connecting conduit (a) leading to the lateral sides of the on-off valve (10).

I claim:

1. A structure for a running system in a work vehicle, with provision of right and left running wheels (1), (1), hydraulic cylinders (5), (5) with pistons which function as axle suspension means extensible and retractable in opposition to each other in response to axle-tilting displacement of the wheels as the wheels rise and lower in turn in opposition to each other, a conduit (a) connecting the cylinders (5), (5) to each other with an on-off valve (10) interposed therebetween to be arbitrarily maneuverable to lock up both cylinders (5), (5), and a conduit (17) made connectable to said cylinder-connecting conduit (a) for supplying oil to fill any of the cylinders (5), (5), characterized in that the oil-supply conduit (17) is connected to the on-off valve (10) by bifurcation branch passages (k, n, m,; k,n,m) to both lateral sides thereof where the cylinder-connecting conduit (a) is respectively connected, and that in both the bifurcation branch passages (k,n,m; k,n,m,) there are provided, respectively, valves (11), (11) adapted to supply oil from said supply conduit (17) to said cylinder-connecting conduit (a) only when the inner pressure within this cylinder-connecting conduit (a) has dropped to a negative pressure below a preset threshold.

2. The structure of claim 1, characterized in that both the bifurcation branch passages (k,n,m; k,n,m) and both the negative-pressure-responsive valves (11),(11) are accommodated within the said on-off valve (10).

3. The structure of claim 2, characterized in that said valve casing comprises a valve casing body proper (12a) and, has mounted on both lateral sides thereof, two valve casing lids (12b),(12b), and that in each of said valve casing lids (12b),(12b) there are provided said respective one bifurcation branch passage (k,n,m) and negative-pressure-responsive valve (11).

4. The structure of claim 3, characterized in that within the casing body proper (12a) there is provided a passage (d) in communication with said oil-supply conduit (17) and that this passage (d) is made to come in alignment with the passageways (k),(k) of the respective bifurcation branch passages (k,n,m; k,n,m) so as to come in communication therewith and is also made to be in communication with passageways (e),(e) which are made in turn to come in communication, via respective passageways (g),(g) provided in the valve casing lids (12b),(12b) and respective piston chambers (c),(c) of needle valves (13),(13) provided for the said arbitrary maneuvering of locking up the axle-suspension cylinders (5),(5), to the cylinder-connecting conduit (a).

* * * * *

UNITED STATES PATENT AND TRADEMARK OFFICE
CERTIFICATE OF CORRECTION

PATENT NO. : 4,382,604

DATED : May 10, 1983

INVENTOR(S) : Masao Nakagawa

It is certified that error appears in the above—identified patent and that said Letters Patent is hereby corrected as shown below:

Column 5, line 2, after "within" insert --a casing of--.

Column 5, line 2, delete "the".

Signed and Sealed this

Twenty-seventh Day of September 1983

[SEAL]

Attest:

GERALD J. MOSSINGHOFF

Attesting Officer

Commissioner of Patents and Trademarks